US008256954B2

(12) United States Patent
Giors et al.

(10) Patent No.: US 8,256,954 B2
(45) Date of Patent: Sep. 4, 2012

(54) CONTACTLESS DEVICE FOR MEASURING OPERATING PARAMETERS OF ROTORS OF HIGH-SPEED ROTARY MACHINES

(75) Inventors: Silvio Giors, Caselle (IT); Oriano Bottauscio, Turin (IT); Mario Chiampi, Turin (IT); Gabriella Crotti, Turin (IT); Fausto Fiorillo, Pinerolo (IT)

(73) Assignee: Agilent Technologies, Inc., Santa Clara, CA (US)

( * ) Notice: Subject to any disclaimer, the term of this patent is extended or adjusted under 35 U.S.C. 154(b) by 697 days.

(21) Appl. No.: 12/420,566

(22) Filed: Apr. 8, 2009

(65) Prior Publication Data

US 2009/0257470 A1 Oct. 15, 2009

(30) Foreign Application Priority Data

Apr. 9, 2008 (EP) .................... 08425236

(51) Int. Cl.
  *G01K 1/14* (2006.01)
  *G01K 13/08* (2006.01)
  *G01K 7/36* (2006.01)
  *G01K 7/38* (2006.01)

(52) U.S. Cl. .............. 374/163; 374/153; 374/141

(58) Field of Classification Search .......... 374/163, 374/141, 100, 176, 142, 152, 153, 166, 183, 374/184, 208; 318/798, 806
See application file for complete search history.

(56) References Cited

U.S. PATENT DOCUMENTS

| | | | | |
|---|---|---|---|---|
| 3,157,809 A | * | 11/1964 | Bekey | 310/156.83 |
| 3,738,175 A | * | 6/1973 | Linsig | 307/117 |
| 4,337,655 A | * | 7/1982 | Sundstrom et al. | 73/861.03 |
| 5,418,451 A | | 5/1995 | Maass et al. | |
| 6,538,426 B1 | * | 3/2003 | Enrietto et al. | 324/174 |
| 7,417,398 B2 | * | 8/2008 | Kozaki et al. | 318/471 |
| 7,965,054 B2 | * | 6/2011 | Tsunazawa et al. | 318/471 |
| 7,985,022 B2 | * | 7/2011 | Azuma et al. | 374/176 |
| 2005/0243892 A1 | * | 11/2005 | Ortmann | 374/141 |
| 2007/0127551 A1 | * | 6/2007 | Conrad | 374/153 |
| 2007/0145929 A1 | | 6/2007 | Kozaki et al. | |
| 2009/0189561 A1 | * | 7/2009 | Patel et al. | 318/806 |

FOREIGN PATENT DOCUMENTS

| | | |
|---|---|---|
| DE | 2341354 A1 | 2/1975 |
| EP | 0617264 A1 | 9/1994 |
| GB | 1359574 A | 7/1974 |
| GB | 1369658 | 10/1974 |
| GB | 2261518 A | 5/1993 |
| JP | 01239430 | 9/1989 |
| JP | 05083916 | 4/1993 |
| JP | 2006083825 A | 3/2006 |
| JP | 2006194094 | 7/2006 |

* cited by examiner

*Primary Examiner* — Gail Verbitsky

(57) ABSTRACT

A contactless device for measuring at least the temperature of a rotor of a high-speed rotary machine, in particular a turbomolecular vacuum pump, comprises at least one magnetic capsule mounted on the rotor of the pump. The capsule comprises a permanent magnet and at least one pastille of ferromagnetic material having a Curie temperature slightly higher than a maximum temperature to be measured. The magnetic permeability of this material strongly depends on temperature. The pastille is intended to alter the magnetic field generated by the magnet. A detector carried by the stator of the pump generates pulses representative of the magnetic field varying with the rotor temperature, generated by the capsule, whenever the latter passes in front of the detector.

19 Claims, 4 Drawing Sheets

CONTACTLESS DEVICE FOR MEASURING OPERATING PARAMETERS OF ROTORS OF HIGH-SPEED ROTARY MACHINES

CROSS REFERENCE TO RELATED APPLICATIONS

The subject patent application claims priority to European Patent Application No. 08425236.0, filed in the European Patent Office on Apr. 9, 2008.

FIELD OF THE INVENTION

The present disclosure relates to a contactless device for measuring operating parameters of rotors of high-speed rotary machines, in particular for measuring at least the temperature of the rotors. More specifically, the invention concerns a device exploiting the variation of magnetic properties of a material with temperature.

Preferably, but not exclusively, the present invention is used for measuring at least the temperature of the rotor of a turbomolecular vacuum pump.

In the majority of rotary machines, such as gas compressors, turbines, vacuum pumps, electrical machines, etc., the rotor temperature is an operating parameter to be monitored and strictly controlled in order to allow for a safe and reliable operation and to prevent failures. Specifically, in vacuum pumps, situations can occur where rotor overheating is not perceived by any direct measurement of the stator temperature, because of the deficient thermal exchange between the two parts. A typical example is a turbomolecular pump working under high vacuum conditions inside an external magnetic field heating the rotor through eddy current dissipation. The data on temperature must therefore be transmitted in determined manner from the rotor to the stationary part of the machine, where such data is read and possibly processed by a control system operating in closed loop. In some cases, it may be sufficient to generate an alarm signal when the temperature attains or exceeds a given safety threshold. In other cases, a more substantial involvement is requested. It may be necessary to gradually reducing the power or cutting the machine off in the extreme cases of temperature elevation.

In the particular case of turbomolecular vacuum pumps, an excessive rotor temperature can create serious problems for several reasons.

Very small clearances between the rotor and the stator (some tenths of a millimeter when the pump is cold) become yet smaller in a hot pump due to the differential thermal expansion between the rotor and the stator. These clearances could become completely closed thereby causing catastrophic breakdowns. The reliability of the ceramic bearings with high rotation speeds often employed in such pumps in order to support the rotor is negatively affected by high working temperatures. The strength of the manufacturing materials of the rotor is degrading upon long operating periods at excessive temperatures, so the rotor may undergo catastrophic structural failures.

When operating parameters of the rotors of machines with very high tangential speeds (typically exceeding 100 m/s), such as turbomolecular pumps, are to be measured, use of contactless techniques is indispensable to transmit the temperature information. Indeed, in such case, brushes cannot be used for transmitting the signals provided by a contact sensor mounted on the rotor because of the excessive friction that would be generated between the rotor and the stator.

Several contactless techniques are known for detecting the temperature of the rotor of a rotary machine: measuring infrared radiations emitted by the rotor; measuring the temperature through contact probes (thermistors or thermo-couples) and transmitting the electric signals generated by the probes by radio; and detecting changes in electric or magnetic properties of certain materials with temperature variations.

The first two techniques however are not suitable for use with turbomolecular vacuum pumps or, generally, with high-speed rotary machines operating in "dirty" environments. Currently available infrared detectors cannot properly operate in vacuum and, moreover, the accuracy of measurement can be affected by changes in the rotor surface emissivity and by impurities deposited on the detector lenses. The systems employing radio transmitters generally request relatively heavy batteries causing unbalanced state, which is difficult to correct in high-speed rotors.

The devices for use in connection with turbomolecular pumps, which undergoing changes in the electric and, above all, magnetic properties of certain materials, must be robust and reliable in respect of the above mentioned problems. Several conventional methods and devices utilize variations of the magnetic properties of elements associated with the rotor of which the temperature is to be detected.

Many of such known methods and devices are based on detecting that the Curie temperature of magnetic elements has been exceeded. For example, the patent publications of JP 01-239430 and JP 5-83916 propose coupling together multiple permanent magnets having different Curie temperatures, and exploiting the loss of magnetic behavior by one or more magnets to implement or to control a thermal switch function when the respective Curie temperature is exceeded.

The German patent DE 2341354 discloses a device detecting-displaying the temperature of rotary or oscillating machine parts. The device comprises a plurality of ferromagnetic inserts secured to the moving part and having different Curie temperatures for covering a certain temperature range, and an inductive pulse generator on the stationary part. As the temperature increases, the number of pulses being generated decreases due to the loss of magnetization by an increasing number of inserts.

The European patent EP 617264 discloses a measuring device in which the rotor of a turbomolecular pump carries one or more rings of ferromagnetic material with permeability variable with temperature forming a magnetic circuit with components secured to the stator. The magnetic resistance of the circuit is measured by measuring the voltage across a coil wound onto a ferromagnetic element on the stator in order to determine if the Curie temperature of the ring or one of the rings secured to the rotor has been exceeded.

The patent publications JP 2006-083825, JP 2006-194094 and US 2007/0145929 disclose devices capable of detecting that the Curie temperature of a magnetic body secured to the rotor of a vacuum pump has been exceeded, by using inductive detectors on the stator. The detectors are capable of detecting the changes in the magnetic permeability of the body as changes in the inductance.

The UK patent GB 1 369 658 discloses a device in which the rotor of an electrical machine, such as an electric motor, carries a magnet acting as a source of a stationary magnetic field. A ferromagnetic pastille has the magnetic permeability that depends on the temperature and the Curie temperature corresponds to a limit temperature allowed for the rotor. A magnetic field detector associated with the stator detects the magnetic field when the magnet and the pastille pass in front of it. The attainment of the Curie temperature of the pastille, and hence of the limit temperature, is signaled by a sudden decrease in the amplitude of the signals provided by the detector due to the loss of magnetization of the pastille.

All devices based on the detection of the exceeded Curie temperature have the common drawback. They are intended only to detect the attainment of a limit temperature acting as a switch. When such devices monitor temperature within a range of values, they can perform it only by using a plurality of elements of different materials, the number of which has to be higher when the precise measurement is requested. In such case, the devices are complex and therefore expensive. Moreover, complication and cost are considerable, taking into account that different lots of a sensing material utilized for ensuring measurement repeatability can exhibit differences in the Curie temperature.

The patent application US 2007/0127551 discloses a device, comprising a permanent magnet secured to the rotor, an inductive magnetic field detector secured to the stator and electronic circuitry arranged to convert voltage signals supplied by the detector into temperature information. The magnet is chosen so that its magnetic properties linearly and reversibly depend on temperature within the temperature range of interest. The device obviates the drawbacks of the previously discussed techniques based on the determination of the Curie temperature. Yet, the variations of the magnetic field generated by a permanent magnet with temperature in the linearity region of such variations are very limited. Therefore a device of this kind is lack of requested sensitivity and preciseness unless sophisticated and therefore expensive, detectors and electronics are employed.

Thus, it is an object of the present invention to provide a contactless device of a simple and inexpensive structure for measuring the temperature, and, if required, other operating parameters such as the rotational speed of rotors of high-speed rotary machines, which obviates the drawbacks of the prior art and allows for a precise measurement of temperatures within a wide range.

This object is achieved, according to a first aspect of the invention, by means of a device in which the source of magnetic field, in particular a permanent magnet, is associated with the rotor via at least one element of a soft magnetic material having a magnetic permeability strongly dependent on the temperature and a controlled Curie temperature exceeding a maximum temperature to be measured, wherein the element is arranged to alter the shape of the lines of force of the magnetic field in correspondence of the detector.

The provision of the element with a magnetic permeability strongly dependent on temperature, preferably made of a specific Fe—Ni alloy, causes a much stronger variation of the magnetic flux induced by the permanent magnet on the detector than the variation due to the mere changes in the magnetization of the permanent magnet only as a function of the temperature. Thus, the device allows for precise measurements without need to use expensive detectors and electronic components.

It is also to be appreciated that, even if the system of the patent GB 1 369 658 uses a permanent magnet in combination with an element with temperature-dependent magnetic permeability, the solution of such prior art is different from the solution suggested by the present invention. In the prior art solution, the Curie temperature of the element responsive to temperature corresponds to a limited temperature allowed for the rotor, therefore this element merely acts as a switch exploiting the sudden loss of magnetization when the Curie temperature is attained. Thus, the addition of such an element to a device similar to the device disclosed in US 2007/0127551 cannot be done since it would be impossible to perform the measurements within a desired temperature range.

According to a feature of the invention, the amplitude of the signals generated by the detector depends not only on the temperature, but also on the speed of the rotor. Since the permanent magnet and the temperature-responsive element periodically pass in front of the detector, the device according to the invention is capable of measuring also the rotational speed of the rotor itself and of compensating the amplitude of the generated signals by relating it to the temperature in one-to-one corresponding to the rotational speed.

The U.S. Pat. No. 5,418,451 discloses a temperature and speed detector for brushless rotors. At least one permanent magnet is mounted onto the rotor and a magnetic field detector located close to the rotor provides signals representative of the temperature and the rotation speed of the rotor. The device exploits the variation of the magnetization of the permanent magnet with temperature. The consideration made in respect of US 2007/0127551 and its possible combination with GB 1 369 658 apply also to the teaching of this patent.

In a second aspect, the invention provides also a turbomolecular vacuum pump in which the temperature, and, if requested the rotational speed of the rotor are measured by means of the proposed device, and the power and/or the rotational speed are controlled in closed loop for not exceeding a given safety temperature limits.

BRIEF DESCRIPTION OF THE DRAWINGS

The device according to the invention will now be described in greater detail with reference to the accompanying drawings, given by the way of a non limiting example, in which.

DETAILED DESCRIPTION OF THE INVENTION

Figure 1:
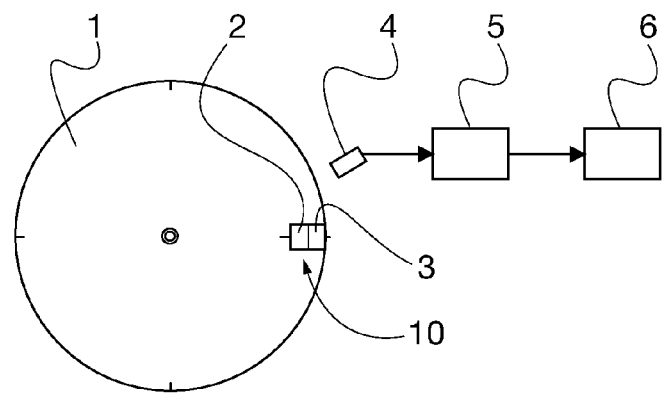
FIG. 1 is a schematic principle representation of the present invention.

Referring to FIG. 1, rotor 1 of a high-speed rotary electrical machine is schematically shown. The rotor is associated with a device for determining at least the temperature and preferably also the speed, of rotor 1. The device must be capable of detecting temperatures ranging from a minimum temperature Tmin to a maximum temperature Tmax. For example, in the case of the preferred application to turbomolecular vacuum pumps, the range will typically be from about 20° C. to about 120° C.

The device according to the invention essentially comprises three parts: at least one permanent magnet 2, mounted onto rotor 1 and acting as a source of a magnetic field (for sake of simplicity FIG. 1 shows a single magnet); a magnetic pastille 3, or a pair of pastilles 3 (FIG. 1 shows a single pastille 3), of soft magnetic material with a magnetic permeability strongly dependent on temperature, the pastille(s) is associated with permanent magnet 2, aligned along the magnetic axis of the magnet on rotor 1, and intended to alter the magnetic field generated by magnet 2 in a manner depending on the temperature of rotor 1; and a magnetic field detector 4 carried by the stationary part of the machine.

Each permanent magnet 2 comprises for instance a plate or disc of hard magnetic material, with Curie temperature $T_c \gg T_{max}$. Advantageously, the magnetic properties of the material are such that the magnet can be considered an ideal magnet. In a magnet of that kind, the "residual state" is not significantly affected by strong external magnetic fields and by temperature, and thus it does not change with time. Sm—Co alloys, e.g. Sm2Co17 or SmCo5, are commonly used for producing substantially ideal magnets.

Magnetic pastille(s) 3 is (are) to be mounted with a good thermal contact with rotor 1, and is (are) made of a soft magnetic material with a controlled Curie temperature, slightly above Tmax. Advantageously, the material is an Fe—Ni alloy, the exact composition of which will depend on the temperature range and in particular on Tmax.

Figure 2:
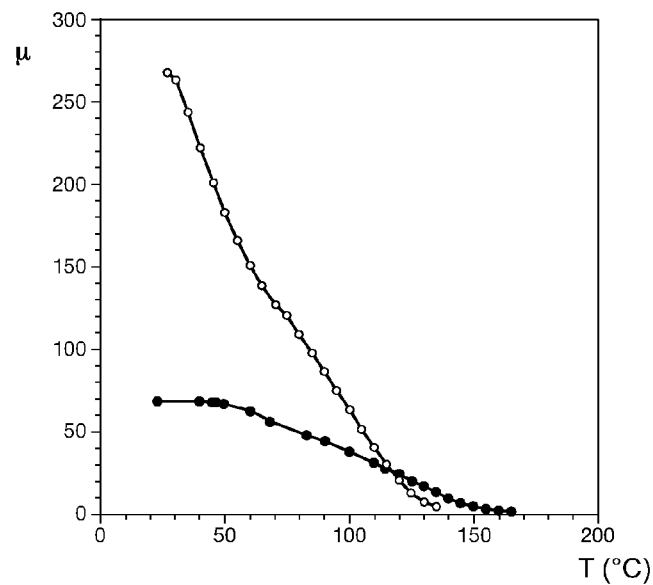
FIG. 2 is a graph of the relative magnetic permeability versus temperature for two exemplary materials utilizable for the ferromagnetic pastille.

FIG. 2 shows the relative magnetic permeability of two Fe—Ni alloy compositions suitable for the preferred application to turbomolecular pumps, namely an Fe69Ni31 alloy (TC≈160° C.) and an Fe69.5Ni30.5 alloy ($T_c \approx 140°$ C.). It is clearly apparent that the permeability variation with temperature is approximately linear and is very strong, especially for the Fe69.5Ni30.5 alloy.

Magnet 2 and pastille 3, or the pair of pastilles 3, form together a magnetic capsule 10 having both functions of source of magnetic field and temperature-responsive element. Should capsule 10 comprise two pastilles 3, these will be axially located on opposite sides of magnet 2. FIG. 1 shows a radial mounting of capsule 10 (with reference to the rotation axis) at the periphery of rotor 1, though an axial mounting is also possible. Moreover, multiple magnets 2, and hence multiple capsules 10 can be provided. A solution with multiple capsules 10 arranged at regular intervals along a circumference, in particular two diametrically opposite capsules 10, is advantageous in order to avoid unbalancing of rotor 1.

Magnetic field detector 4 is arranged to generate voltage pulses representative of the magnetic flux density when capsule 10 passes in front of it during rotation of rotor 1. The voltage pulses are fed to an analogue-to-digital converter 5 followed by processing devices 6 converting the voltage values into temperature information, which can be fed back to the control units of the machine. The electronic circuitry is conventional and further details are not necessary. For sake of simplicity, the feedback is not shown, since it is well known to the skilled in the art and is not part of the invention.

Advantageously, magnetic field detector 4 is an inductive detector formed by a coil of conductive wire or by a spiral track deposited on an electronic circuit board, e.g. by lithographic techniques. An inductive detector of such kind has high robustness and good thermal stability. As an alternative to an inductive detector, a Hall effect detector can be used.

The operating principle of the device according to the invention is as follows. Permanent magnet 2 generates a dipole magnetic field, which passes through pastille(s) 3, then into vacuum or air where rotor 1 is immersed, and is collected by detector 4 and is measured by electronic circuits 5, 6. Since the magnetic permeability of the material of pastille 3, and hence its capacity to axially deviate the lines of the magnetic field, decreases as temperature increases (see FIG. 2), the magnetic flux arriving at the measurement point, where magnetic field detector 4 is located, monotonically decreases as temperature increases. When the magnetic permeability decreases, the lines of force of the magnetic field globally decrease and tend to remain confined within the rotor itself.

The invention thus provides a device that is based neither on the detection that the Curie temperature of a certain material has been exceeded, nor on the change in the resistance of a magnetic circuit or an inductance, but on the change in the shape of the lines of the magnetic field at a certain point, and hence on the variation of the magnetic flux applied to a corresponding detector located at that point. Detecting the variations in the field distribution has a twofold advantage over measuring the flux variation in a magnetic circuit. It makes the system behavior independent of possible electromagnetic phenomena (saturation effects, eddy currents), which could occur in the circuit part that is not formed of sensing material and which could perturb such behavior; and it exploits the tendency of the flux to follow the path of least resistance. In other words, the lines of force, in the absence of high-permeability components, tend to follow minimum-length paths, thereby affecting to a lesser extent the region where the detector is located: the resulting flux reduction adds to the reduction caused by the only reduction in the permeability of the sensing material, thereby amplifying the intensity of the phenomenon.

The skilled in the art will further appreciate that the combination of a permanent magnet and a pastille of Fe—Ni alloy used according to the invention has a much stronger dependency on temperature than a permanent magnet at temperatures sensibly below Curie temperature. For instance, a permanent magnet of an Sm—Co alloy has a magnetization variation of the order of 10% in the range from ambient temperature to 200° C. (and hence a variation slightly exceeding 5% in the range up to 120° C. of interest for the preferred application), whereas the combination according to the invention, in the case of an Fe—Ni alloy with Curie temperature of about 140° C., has a field variation of the order of 50% in the same temperature range. In practice, the pastille of soft ferromagnetic material acts as an amplifier of the variation of the magnetic field generated by permanent magnet 2 with temperature. The invention therefore dispenses with the need to use particularly sensitive and sophisticated detectors 4 and electronic components with a considerable cost saving.

Figure 3:
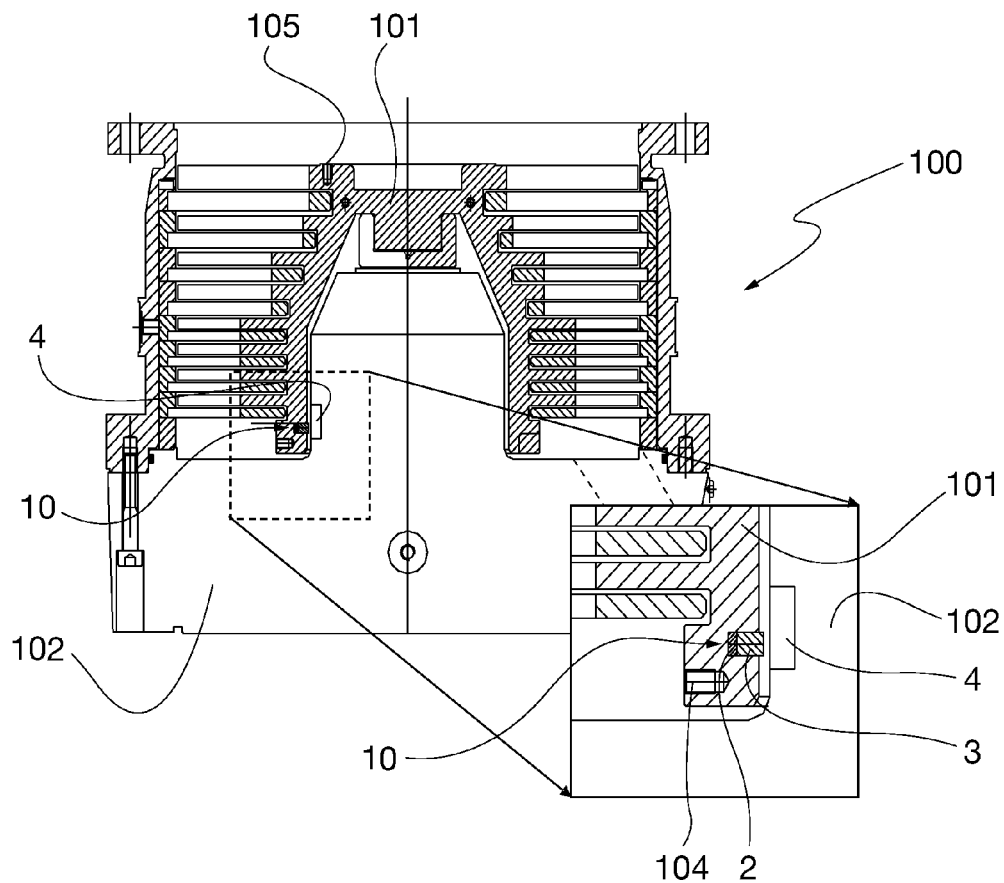
FIG. 3 is a schematic partial representation of a turbomolecular pump equipped with the device according to the invention.

FIG. 3 shows a schematic and partial cross-sectional view of a turbomolecular pump 100 equipped with a temperature and rotation sensor according to the invention. Reference numerals 101 and 102 denote the rotor, which in the drawing is of the bell-shaped type, and the stator/body of pump 100, respectively. Pump 100 is a conventional type and therefore its detailed description is not presented.

In the illustrated example, rotor 101 is equipped with a magnetic capsule 10 that is radially mounted onto the internal surface of rotor 101 and comprises, besides permanent magnet 2, a single pastille 3 sensitive to temperature. Capsule 10, of cylindrical shape, is located for instance in a blind, smooth hole, where it is kept in place by gluing or by press fitting or hot fitting. Field detector 4 is in turn mounted on body 102 inside the bell cavity, opposite capsule 10. This arrangement is an exemplary one.

Figure 4:
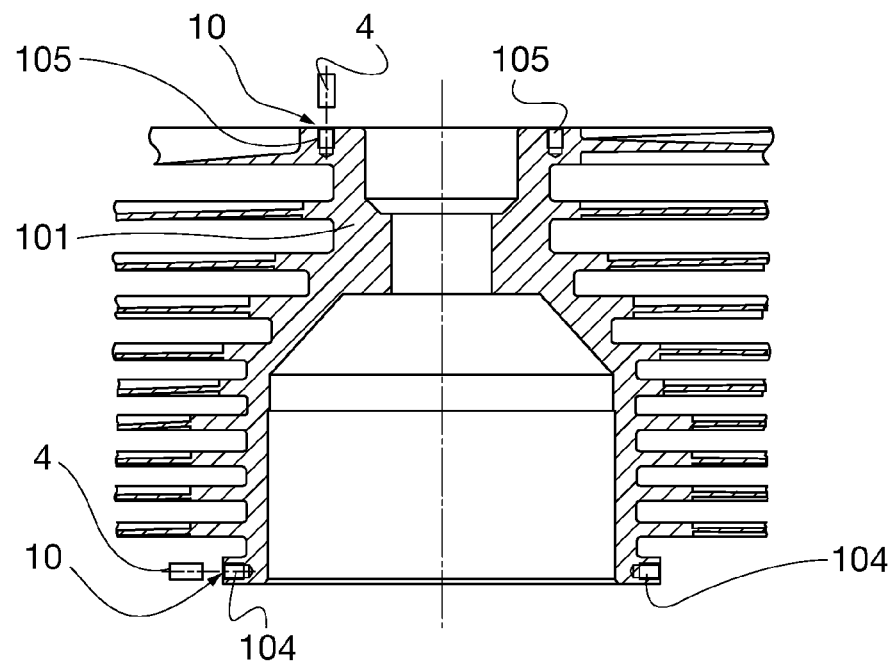
FIG. 4 is a cross-sectional view of the rotor of the pump shown in FIG. 3, showing two possible arrangements, a radial and an axial arrangement, of a magnetic pastille.

FIG. 4 shows a cross-sectional view of rotor 101 only. The rotor has both a pair of radial bores 104 (formed, in the illustrated example, in the lower portion of rotor 101), and a pair of axial bores 105 (in the upper portion), where balancing beads can be screwed, the holes in each pair being diametrically opposite. Such holes can then be used for mounting (axially or radially) capsule 10 or a pair of capsules 10, by locating detector 4 opposite one of said holes. Thus, forming specific seats is not required. FIG. 4 shows both the radial and the axial mounting of capsule 10, and also shows the corresponding locations of detector 4.

Figure 5:
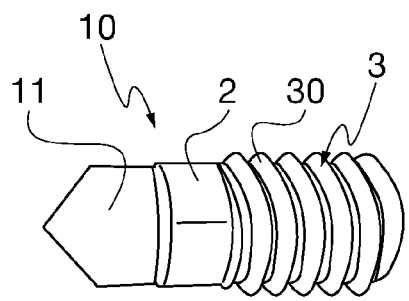
FIG. 5 is a side view of a magnetic capsule utilizable with the pump shown in FIGS. 3 and 4.

FIG. 5 shows an exemplary capsule 10 suitable for mounting in threaded balancing holes 104, 105 within rotor 101. Both magnet 2 and pastille 3 are cylindrical, and pastille 3 has an external thread 30 arranged to engage the hole thread to secure capsule 10 to rotor 101. On the opposite side of pastille 3, disc 2 is associated with a conical element 11, e.g. made of Teflon, arranged to fill the bottom of hole 104 or 105 and to provide a plane abutment surface for magnet 2.

Figure 6:
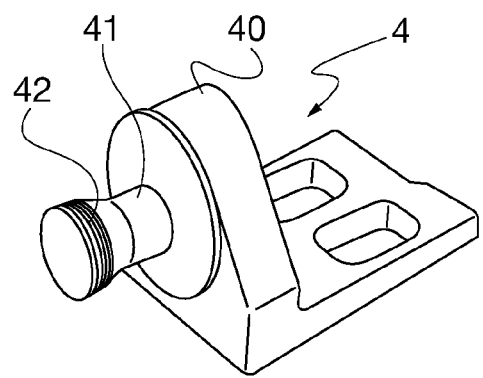
FIG. 6 is a perspective view of an inductive detector utilizable with the pump shown in FIGS. 3 and 4.

FIG. 6 shows an exemplary inductive magnetic field detector 4, comprising a supporting portion 40 arranged to be secured to body/stator 102 and having a core or nose 41 on which a coil 42 formed by a suitable number of copper wire loops is wound.

Figure 7:
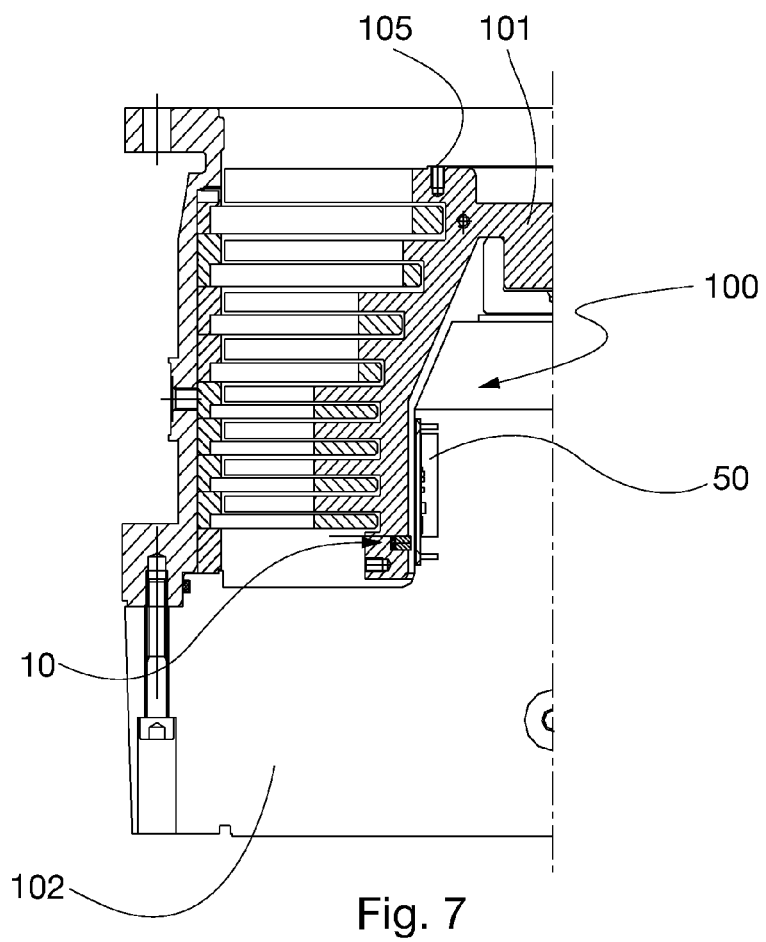
FIG. 7 is a representation, similar to FIG. 3, of a turbomolecular pump equipped with the device according to the invention, in which the detector is deposited on a printed circuit board.

As shown in FIG. 7, instead of the only field detector 4, a printed circuit board 50 arranged to operate in vacuum can be mounted onto body 102 of pump 100.

Figure 8:
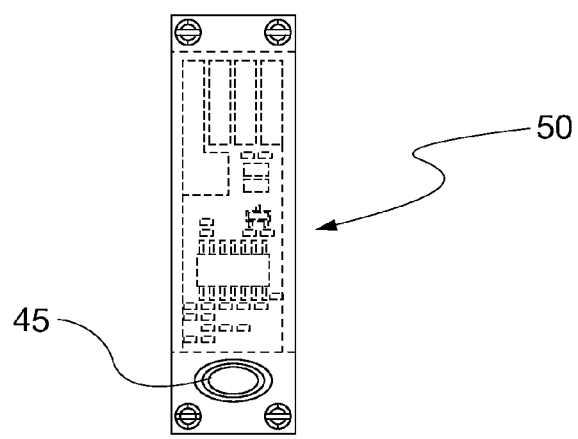
FIG. 8 shows a printed circuit board utilizable in the pump shown FIG. 7.

As shown in FIG. 8, the board carries the detector formed by a set of tracks 45, deposited e.g. by lithographic techniques, and part of the processing electronic circuitry 5, 6, more particularly the filtering and amplifying circuits. Such a solution has the advantage that it allows bringing an already filtered and preamplified signal outside the pump, at a remote location.

Preferably, tracks 45 have spiral, circular or elliptic shape, or a pseudo-spiral shape, that is, they comprise concentric rings interrupted and connected in series with the immediately adjacent tracks of different diameters. In case of elliptic tracks, the major axis is preferably oriented along the direction of passage of the magnetic capsule. Also it is possible to form several layers of serially connected tracks.

Figure 9:
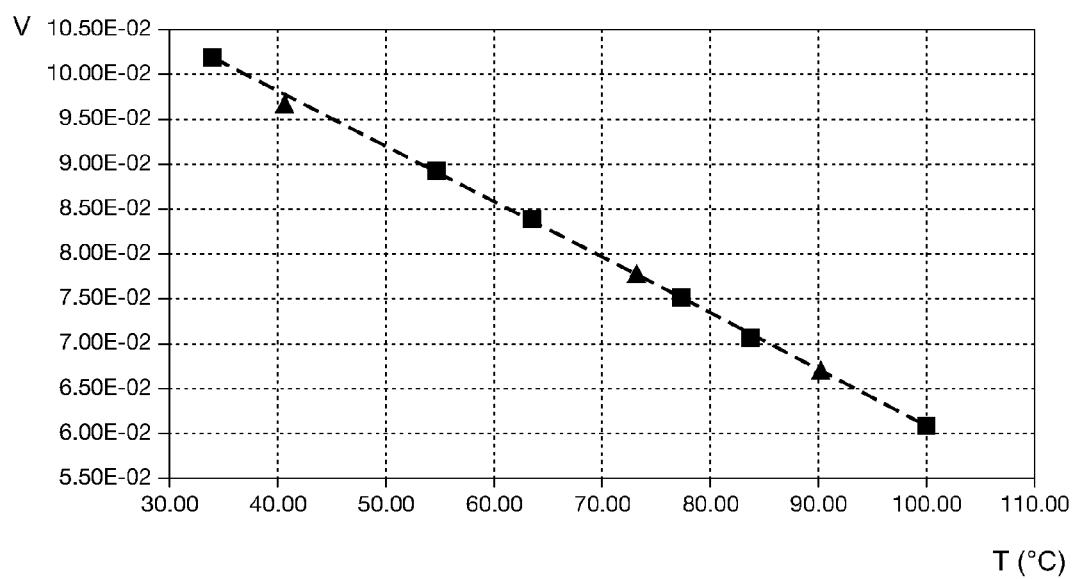
FIG. 9 is a graph of the peak-to-peak amplitude of the signal measured at the output from the magnetic field detector, as a function of temperature.

FIG. 9 shows peak amplitude of the voltage induced on the induction coil as a function of temperature, measured again on a turbomolecular pump the rotor of which was rotated at maximum speed. The measurements have been carried out with the detector spaced apart by 1.9 mm from capsule 10 axially mounted in one of holes 105 (FIGS. 3 and 4) and comprising a single pastille 3. The temperature has been determined by means of an infrared thermal chamber located above rotor 101. Two sets of measurements have been carried out at different instants, one in the range 30 to 100° C. (square dots) and the other in the range 40 to 100° C. (triangular dots). It is clearly apparent that the peculiar choice of the materials and the shape of the components enabled attaining a linear behavior of the amplitude of output signals of detector 4 as a function of temperature. Moreover, also the good repeatability of the results between the two measurements carried out at different instants is clearly apparent.

It is to be appreciated that, by the described arrangement detector 4 generates a voltage signal when capsule 10 passes in front of the detector itself. Moreover, the peak amplitude of such signal is dependent in known manner not only on temperature, but also on rotation frequency. The processing electronic circuitry can readily obtain the rotor speed from the frequency at which the capsule passes in front of detector 4, and compensate for the peak amplitude to provide for a one-to-one correspondence with temperature.

It is clear that the above description has been given only by way of non-limiting example and that changes and modifications are possible without departing from the scope of the invention. For instance, even if the above description refers to a source of magnetic field consisting of a permanent magnet with $T_C \gg T_{max}$, such a source could even be a coil in which a current flows, where the stability of the current as the temperature varies is guaranteed.

What is claimed is:

1. A device for measuring operating parameters including temperature of a rotor of a high-speed rotary machine, the device comprising:
    at least one source of a magnetic field mounted on the rotor;
    at least one element of a magnetic material associated with the at least one source, said magnetic material having magnetic permeability substantially dependent on temperature within a range of interest for measurement and having a controlled Curie temperature higher than a maximum temperature to be measured;
    a magnetic field detector associated with a stationary part of the machine for generating a signal representation of magnetic flux induced by the at least one source onto the detector when the source passing in front of the detector; and
    electronic circuits for processing said signal and obtaining at least a datum on temperature therefrom,
    wherein said at least one element is aligned along a magnetic axis of the at least one source altering a shape of lines of force of the magnetic field generated by the at least one source corresponding to the temperature of the rotor, and
    wherein said at least one source and the at least one element with temperature-dependent magnetic permeability form a magnetic capsule axially or radially mounted on said rotor.

2. The device of claim 1, further comprising at least one pair of magnetic capsules, including the magnetic capsule formed of the at least one source and the at least one element, mounted on said rotor at diametrically opposite positions.

3. The device of claim 2, wherein the materials and the shapes of components of the capsule(s) are arranged to produce a linear behavior of the magnetic field as a function of temperature in a temperature range between a minimum temperature and said maximum temperature.

4. The device of claim 3, wherein said magnetic field detector is selected from the group consisting of Hall effect detectors and inductive detectors.

5. The device of claim 1, wherein said electronic circuits are arranged to obtain the speed of said rotor.

6. The device of claim 1, wherein the magnetic capsule is kept within a blind smooth hole of the rotor by gluing or press fitting or hot fitting.

7. The device of claim 1, wherein said at least one source is an ideal magnet.

8. The device of claim 1, wherein said at least one source is made of a Sm—Co alloy having the Curie temperature substantially higher than said maximum temperature.

9. The device of claim 8, wherein said at least one element with a temperature-dependent magnetic permeability is made of a Fe—Ni alloy.

10. The device of claim 9, wherein said at least one source is associated with a pair of elements, each with a temperature-dependent magnetic permeability.

11. A device for measuring operating parameters including temperature of a rotor of a high-speed rotary machine, the device comprising:
    at least one source of a magnetic field mounted on the rotor;
    at least one element of a magnetic material associated with the at least one source, said magnetic material having magnetic permeability substantially dependent on temperature within a range of interest for measurement and having a controlled Curie temperature higher than a maximum temperature to be measured;

an inductive magnetic field detector associated with a stationary part of the machine for generating a signal representation of magnetic flux induced by the at least one source onto the detector when the source passing in front of the detector; and electronic circuits for processing said signal and obtaining at least a datum on temperature therefrom, wherein said at least one element is aligned along a magnetic axis of the at least one source altering a shape of lines of force of the magnetic field generated by the at least one source corresponding to the temperature of the rotor, and wherein said detector comprises a spiral track deposited on a printed circuit board.

12. The device of claim 11, wherein said printed circuit board comprises at least a part of said electronic circuits.

13. The device of claim 12, wherein the rotary machine is a turbomolecular vacuum pump.

14. A device for measuring operating parameters including temperature of a rotor of a high-speed rotary machine, the device comprising:

a magnetic capsule mounted on the rotor, the capsule comprising at least one source of a magnetic field and at least one element of magnetic material associated with the at least one source, said magnetic material having magnetic permeability substantially dependent on temperature within a range of interest for measurement and having a controlled Curie temperature higher than a maximum temperature to be measured;

a magnetic field detector associated with a stationary part of the machine for generating a signal representation of magnetic flux induced by the at least one source onto the detector when the source passing in front of the detector; and electronic circuits for processing said signal and obtaining at least a datum on temperature therefrom, wherein said at least one element is aligned along a magnetic axis of the at least one source altering a shape of lines of force of the magnetic field generated by the at least one source corresponding to the temperature of the rotor, and wherein said capsule is mounted into a threaded hole for a balancing bead in the rotor of the rotary machine.

15. The device of claim 14, wherein the at least one element comprises a material with temperature-dependent magnetic permeability having the Curie temperature not lower than 130° C.

16. The device of claim 14, wherein the magnetic capsule with a cylindrical shape is threaded over at least part of an external surface of the at least one element, the at least part of the external surface being configured to be screwed in the threaded hole of the rotor for a balancing bead.

17. The device of claim 16, further comprising a pair of magnetic capsules mounted in a pair of corresponding threaded radial holes of said rotor.

18. The device of claim 14, wherein the magnetic capsule is axially mounted on the rotor.

19. The device of claim 14, wherein the magnetic capsule is radially mounted on the rotor.

* * * * *